United States Patent
Hauleitner et al.

(10) Patent No.: US 12,305,707 B2
(45) Date of Patent: May 20, 2025

(54) ROLLING-ELEMENT BEARING CAGE, ROLLING-ELEMENT BEARING, VEHICLE, AND METHOD FOR ASSEMBLING A ROLLING-ELEMENT BEARING CAGE

(71) Applicant: AKTIEBOLAGET SKF, Gothenburg (SE)

(72) Inventors: Rudolf Hauleitner, Ann Arbor, MI (US); Alexander Mocnik, Steyr (AT); Hans Wallin, Cape Coral, FL (US); Magnus Arvidsson, Henan (SE)

(73) Assignee: AKTIEBOLAGET SKF, Gothenburg (SE)

( * ) Notice: Subject to any disclaimer, the term of this patent is extended or adjusted under 35 U.S.C. 154(b) by 89 days.

(21) Appl. No.: 18/136,833

(22) Filed: Apr. 19, 2023

(65) Prior Publication Data
US 2024/0352971 A1 Oct. 24, 2024

(51) Int. Cl.
F16C 33/38 (2006.01)
F16C 19/06 (2006.01)

(52) U.S. Cl.
CPC .......... *F16C 33/3862* (2013.01); *F16C 19/06* (2013.01); *F16C 33/3868* (2013.01); *F16C 33/3875* (2013.01); *F16C 2226/70* (2013.01); *F16C 2226/74* (2013.01)

(58) Field of Classification Search
CPC ............. F16C 33/3862; F16C 33/3868; F16C 33/3875; F16C 33/4641; F16C 33/4647; F16C 33/4652; F16C 2226/74; F16C 2361/01
See application file for complete search history.

(56) References Cited

U.S. PATENT DOCUMENTS

| | | | |
|---|---|---|---|
| 1,366,312 A * | 1/1921 | Danielsson | F16C 33/3868 384/534 |
| 4,451,098 A | 5/1984 | Farley et al. | |
| 9,512,880 B2 | 12/2016 | Yasuda | |
| 10,247,241 B2 | 4/2019 | Taniguchi | |
| 2010/0046875 A1 | 2/2010 | Doyer et al. | |

(Continued)

FOREIGN PATENT DOCUMENTS

| | | |
|---|---|---|
| DE | 102012222800 A1 | 6/2014 |
| WO | 2007135305 A1 | 11/2007 |

(Continued)

OTHER PUBLICATIONS

Unpublished U.S. Appl. No. 17/991,102, Rudolf Hauleitner, et al., filed Nov. 21, 2022.

(Continued)

*Primary Examiner* — Alan B Waits
(74) *Attorney, Agent, or Firm* — J-TEK LAW PLLC; Scott T. Wakeman; Mark A. Ussai

(57) ABSTRACT

A rolling-element bearing cage having a central axis of rotation includes a first cage ring having an axial extension and at least one snap arm disposed directly on the extension, and a second cage ring having an attachment region to which the at least one snap arm is snapped. The attachment region is located at a first distance from the central axis of rotation. A portion of each of the at least one each snap arm of the first cage ring is located at a second distance from the central axis of rotation, the second distance being less than the first distance.

6 Claims, 8 Drawing Sheets

(56) References Cited

U.S. PATENT DOCUMENTS

| | | | |
|---|---|---|---|
| 2013/0156360 A1* | 6/2013 | Uozumi | F16C 33/7893 |
| | | | 384/523 |
| 2013/0330031 A1* | 12/2013 | Mineno | F16C 33/6681 |
| | | | 384/470 |
| 2017/0108043 A1 | 4/2017 | Mocnik et al. | |
| 2017/0292567 A1* | 10/2017 | Taniguchi | F16C 33/3875 |
| 2020/0355222 A1 | 11/2020 | Mocnik | |
| 2021/0262523 A1 | 8/2021 | Ince et al. | |

FOREIGN PATENT DOCUMENTS

| | | |
|---|---|---|
| WO | 2011098357 A1 | 8/2011 |
| WO | 2021069008 A1 | 4/2021 |
| WO | 2021069013 A1 | 4/2021 |

OTHER PUBLICATIONS

Unpublished U.S. Appl. No. 18/083,062, Rudolf Hauleitner, et al., filed Dec. 16, 2022.

* cited by examiner

ROLLING-ELEMENT BEARING CAGE, ROLLING-ELEMENT BEARING, VEHICLE, AND METHOD FOR ASSEMBLING A ROLLING-ELEMENT BEARING CAGE

TECHNOLOGICAL FIELD

The present disclosure is directed to a rolling-element bearing cage, a rolling-element bearing, a vehicle, and a method for assembling a rolling-element bearing cage.

BACKGROUND

There are conventional cages that are one-part and snap into the bearing. They are comprised structurally of a lateral ring with cantilevered crosspieces attached thereto that delimit the cage pockets. In radial bearings, the cantilevered crosspieces are subjected to a centrifugal force due to the rotational speed. At high rotational speeds, the crosspieces bend radially outward. The pocket geometry thereby changes, and a rubbing of the cage on the outer ring of the bearing can result. In the industry, this is known as umbrella effect or "umbrella effect," and limits the bearing rotational speed.

One solution is to optimize a one-part conventional cage by minimizing the mass subjected to the centrifugal force and simultaneously maximizing the rigidity of the lateral ring. An example thereof is a cage that is used for vehicles with electric propulsion Another solution is two cage halves that are manufactured from brass or fabric-reinforced phenolic resin and riveted together.

The publication WO 2007/135305 A1 (family member of U.S. Pat. No. 8,157,449) further discloses a cage without a second lateral ring.

Furthermore, in known roller bearings, the cantilevered crosspieces that delimit cage pockets are provided on the ends with snap arms that snap into a lateral ring. Here in the individual snap connections, snap arms are disposed on a radially upper side and a radially lower side.

SUMMARY

An aspect of the disclosure is in particular to provide a rolling-element bearing cage of the above-described type that is designed for high rotational speeds and that has a design that is also suitable for relatively small bearings.

Disclosed is a rolling-element bearing cage with a first cage ring that includes an axial extension and at least one snap arm disposed directly on the projection and at least one second cage ring having at least one attachment portion to which the at least one snap arm is snapped to form a snap connection.

In the disclosed embodiments there is a section extending in the axial direction of the rolling-element bearing cage in which each snap arm of the first cage ring disposed directly on the extension has a smaller distance from a central axis of the rolling-element bearing cage extending in the axial direction of the roller-element bearing cage than the attachment region. An "axial" extension shall be understood in particular to mean an extension in the axial direction of the rolling-element bearing cage. Further, that "a section extending in the axial direction of the rolling-element bearing cage in which each snap arm of the first cage ring disposed directly on the extension has a smaller distance from a central axis of the rolling-element bearing cage extending in the axial direction of the roller-element bearing cage than the attachment region" shall be understood in particular to mean that in the geometric sense there is an imaginary line that is part of the central axis, extending in the axial direction of the rolling-element bearing cage, of the rolling-element bearing cage, so that the part disposed directly on the extension of the snap arm of the first cage ring, which part lies between a first imaginary plane that is cut vertically from the central axis and which includes a first end point of the line and a second imaginary plane which is cut vertically from the central axis and which includes a second end point of the line, has a shorter distance from the central axis than the part of the attachment region that is disposed between the first plane and the second plane. By a "central axis" of the rolling bearing cage extending in the axial direction of the rolling bearing cage is to be understood in particular a straight line extending in the axial direction of the rolling bearing cage and having a center of mass of the rolling bearing cage. It can thereby be achieved that the rolling-element bearing cage is designed for high rotational speeds and has a design that is also suitable for relatively small bearings. In particular, it can be achieved that the snap arm and the extension experience only a very small deflection away from the central axis in the radial direction when the rolling-element bearing cage rotates quickly. Furthermore, in particular a compact design in the radial direction can be achieved.

In particular, the extension can form a part of a boundary of a pocket of the rolling-element bearing cage.

Furthermore, with respect to a circumferential direction of the rolling-element bearing cage, the snap arm is disposed between two pockets of the rolling-element bearing cage disposed adjacent in the circumferential direction, and a first of the pockets is delimited by a lateral ring of the first cage ring and a lateral ring of the second cage ring and a first crosspiece of the rolling-element bearing cage and a second crosspiece of the rolling-element bearing cage, wherein the second crosspiece has a greater distance from the snap arm than the first crosspiece, wherein the snap arm and/or the extension are or is disposed spaced from the first crosspiece. It can thereby be achieved that the extension can be fully designable according to optimal functional requirements of the snap connection.

Advantageously, the fastening area has a surface area of the rolling bearing cage that is on the outside with respect to a radial direction of the rolling bearing cage. As a result, a low expansion of the rolling bearing cage in the radial direction can be achieved.

Advantageously, the axial portion is an entire axial extent portion of the fastening portion. Through this, a simple design of the snap connection can be achieved.

Furthermore, the first cage ring and the second cage ring may be configured identical. In this way, a cost-effective manufacturability of the rolling-element bearing cage can be achieved. In particular, the cage rings can be produced using a single injection mold.

The second cage ring is advantageously free of snap arms. A simple assembling can thereby be achieved. In particular, the first cage ring and the second cage ring can be attached to each other by snapping when the rolling-element bearing cage includes an odd number of pockets.

The snap arm preferably tapers with increasing distance to the extension. It can thereby be achieved that the snap arm is manufacturable by injection molding. In particular, a simple removing can be achieved of the snap arm from an injection mold after the injection molding.

The snap arm and a further snap arm of the rolling-element bearing cage are advantageously disposed between two pockets adjacent in the circumferential direction of the rolling-element bearing cage. A stable attaching of the two cage rings to each other can thereby be achieved.

Furthermore, a rolling-element bearing is disclosed, in particular a ball bearing with a rolling-element bearing cage as described above.

Furthermore, a vehicle is disclosed with electric propulsion and with the rolling-element bearing, wherein the rolling-element bearing supports a shaft of an electric motor of the vehicle, which shaft (drive shaft) is provided to at least contribute to the propulsion of the motor vehicle. Even with a relatively small design of the rolling-element bearing, high rotational speeds of the shaft or high rotational speeds in the transmission can thereby be achieved.

In addition, a method is disclosed for assembling a rolling-element bearing cage, in particular a rolling-element bearing cage as described above, in which a first cage ring is attached to a second cage ring by a snap connection, wherein all snap arms of the first cage ring that are provided for realizing the snap connection are deflected radially inward during a producing of the snap connection as compared to an unassembled state in which the first cage ring is disposed spaced from the second cage ring. It can thereby be achieved that the rolling-element bearing cage is designed for high rotational speeds and has a design that is also suitable for relatively small bearings. In particular, it can be achieved that the snap arms and cage pocket boundaries experience only a very small deflection away from the central axis in the radial direction when the rolling-element bearing cage rotates quickly. Furthermore, in particular a compact design in the radial direction can be achieved.

When producing the snap connection, partial regions of a lateral ring, which is part of the first cage ring and in an assembled state of the rolling-element bearing cage is disposed on an axial end of the rolling-element bearing cage, are deflected relative to other partial regions of the lateral ring at least in an axial direction of the first cage ring. A large radial displacement of the snap arms can thereby be achieved during a producing of the snap connection. In particular, the deflecting can occur such that the first-mentioned partial regions each perform a rotational movement.

Further advantages arise from the following description of the drawings. Exemplary embodiments of the invention are depicted in the drawings. The drawings, the description, and the claims contain numerous features in combination. The person skilled in the art will also advantageously consider the features individually and combine them into further meaningful combinations.

DETAILED DESCRIPTION

Figure 1:
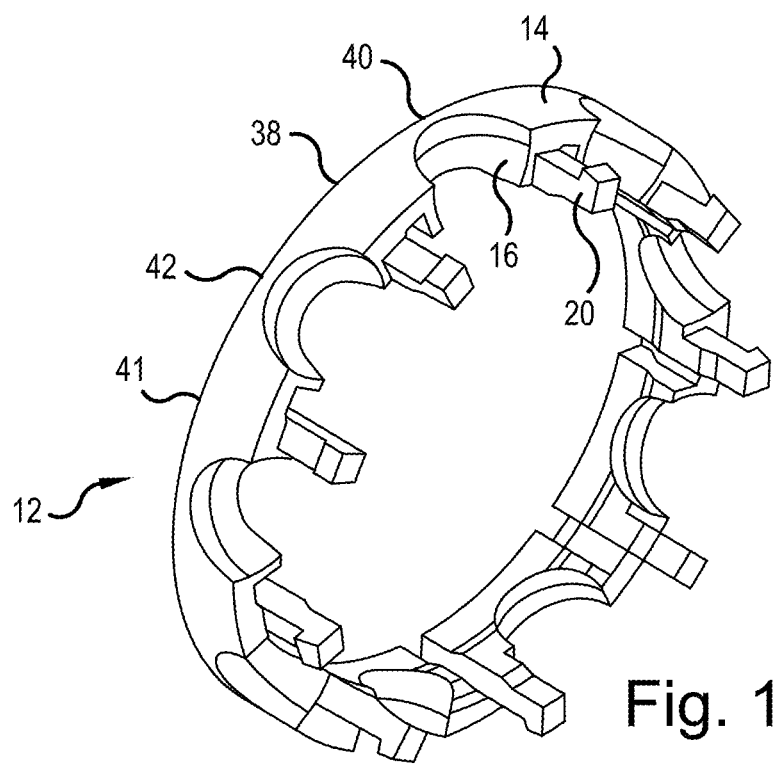
FIG. 1 is a perspective view of a first cage ring of an inventive rolling-element bearing cage according to an embodiment of the present disclosure.
Figure 2:
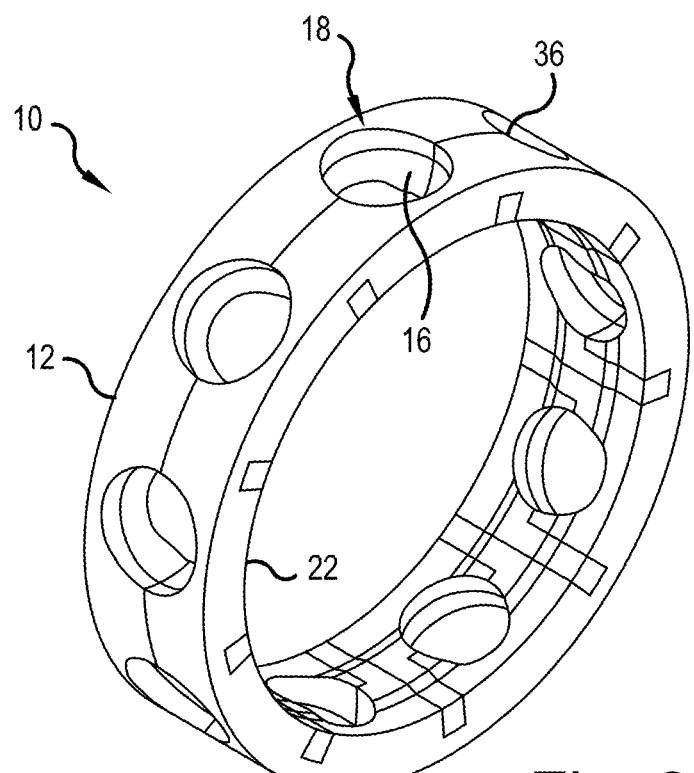
FIG. 2 is a perspective view of the rolling-element bearing cage of FIG. 1.
Figure 3:
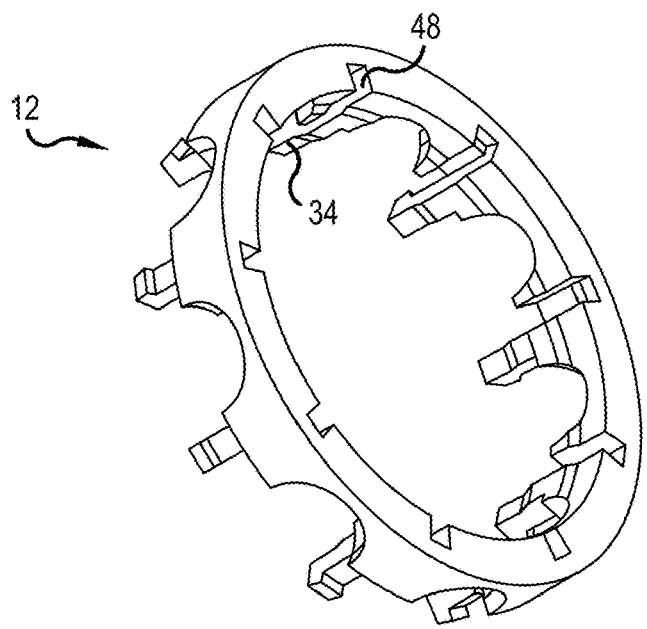
FIG. 3 is a perspective view of a second cage ring of the rolling-element bearing cage of FIG. 1.
Figure 4:
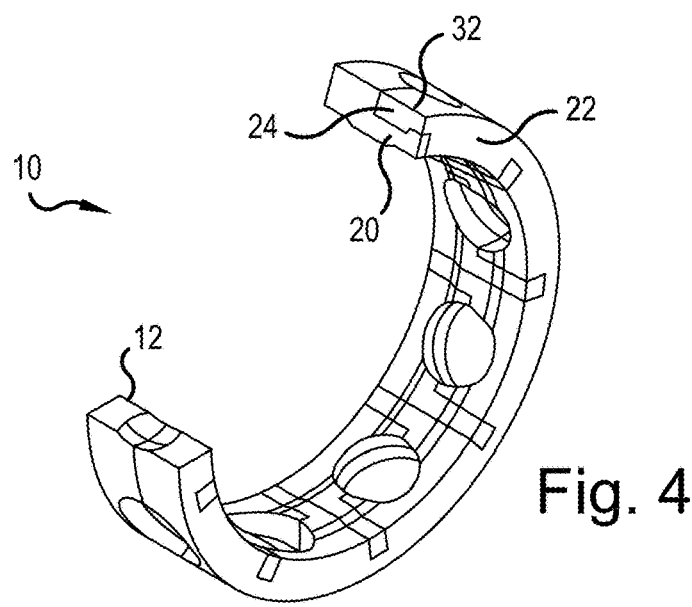
FIG. 4 is a perspective, axial sectional view of the rolling-element bearing cage of FIG. 1.
Figure 7:
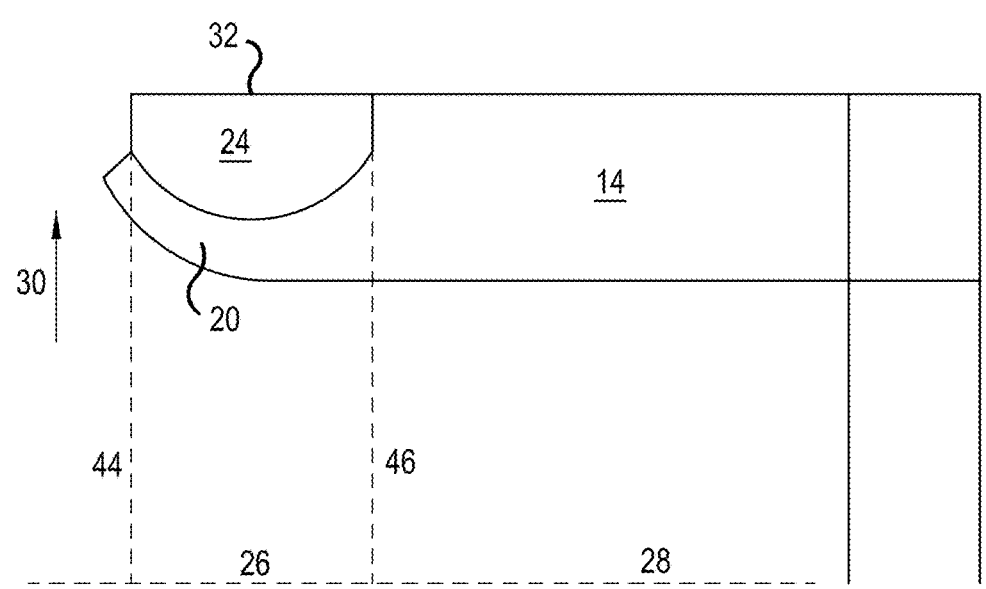
FIG. 7 is a schematic representation of the part of the rolling-element bearing cage after the production of the snap connection.

FIG. 1 shows a perspective view of a first cage ring 12 of an inventive rolling-element bearing cage 10, which is depicted completely in FIG. 2. The cage ring 12 includes a lateral ring 40, to which an axial extension 14 connects. The extension 14 forms a part of a boundary 16 of a pocket 18 of the rolling-element bearing cage. A snap arm 20 is directly attached to the extension 14. The rolling-element bearing cage further includes a second cage ring 22 that comprises an attachment region 24 into which the snap arm 20 is snapped for forming a snap connection (FIGS. 4 and 7). The rolling-element bearing cage has a central axis 28 extending in the axial direction of the rolling-element bearing cage along which central axis 28 there is a section 26 in which each snap arm 20 of the first cage ring 12, which is disposed directly on the extension 14, has a smaller distance from the central axis 28 than the attachment region 24. More precisely, a part of the snap arm 20 that is disposed between two planes 44, 46 that each include an endpoint of the section 26 and are cut vertically from the central axis 28, has a smaller distance from the central axis 28 than the attachment region 24, which is disposed completely between the planes 44, 46 because a complete axial extension region of the attachment region 24 is the axial section 26. Furthermore, the attachment region has a surface region 32 lying outwardly with respect to a radial direction 30 of the rolling-element bearing cage of the rolling-element bearing cage (FIGS. 4 and 7).

The first cage ring 12 and the second cage ring 22 are identically formed. The second cage ring includes a recess 48 into which the snap arm 20 is introduced and snapped during a producing of the snap connection. A snap arm 34 of the second cage ring 22 is directly adjacent to the recess 48. During the producing of the snap connection, the snap arm 34 is introduced and snapped into a recess (not depicted) of the first cage ring 12; the recess is directly adjacent to the snap arm 20. The two snap arms 20, 34 are thus disposed between the pocket 18 and a pocket 36, which are disposed adjacent in the circumferential direction of the rolling-element bearing cage and are thus directly consecutive. Between all adjacent pockets of the rolling-element bearing cage, two snap arms are disposed that form a snap connection as described for the snap arm 20. All snap arms are formed identically.

In comparison to a radially outer surface of the extension 14, the snap arm 20 is disposed radially inward. A tip of the snap arm 20 forms a part of an end surface of the second cage ring 22.

Figure 5:
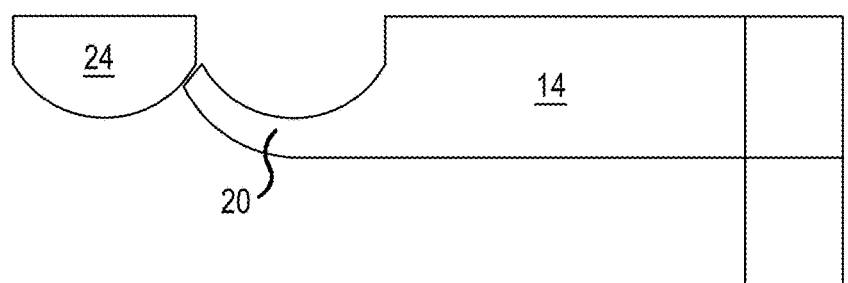
FIG. 5 is a schematic representation of a part of the rolling-element bearing cage of FIG. 1 with a snap arm and an attachment region immediately before a snap connection is formed.
Figure 6:
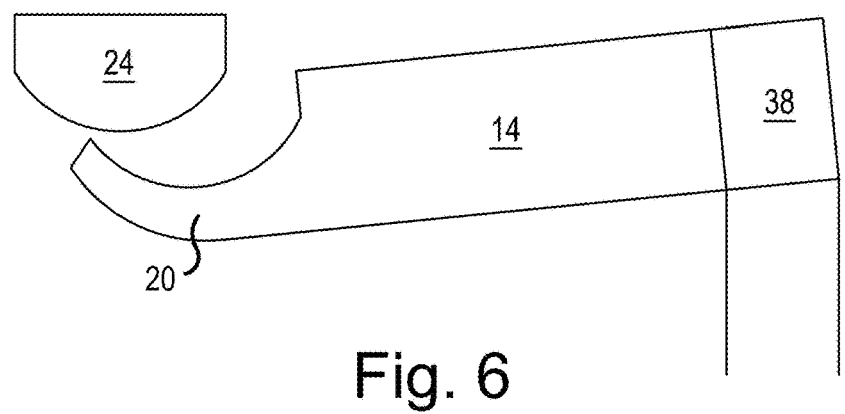
FIG. 6 is a schematic representation of the part of the rolling-element bearing cage during the production of the snap connection.

In the FIGS. 5-7, the different stages are depicted of a producing of the snap connection that is ultimately realized by the snap arm 20 and the attachment region 24. At a start of a forming of the snap connection, a taper of the snap arm 20 contacts the attachment region 24 such that by a further moving of the snap arm 20 toward the attachment region 24, the snap arm 20 is deflected radially inward compare FIG. 6, in which a deformation of the snap arm is not depicted. With a still further moving of the snap arm 20 toward the attachment region 24, in comparison to the arrangement depicted in FIG. 6, the snap arm snaps radially outward and engages behind the attachment region 24. However, in this case the snap arm has a shape which permits non-destructive release of the snap connection by pulling the fastening area 24 and the snap arm 20 apart axially.

Overall, the first cage ring 12 is attached to the second cage ring 22 by a snap connection, which is realized by the individual snap connection of the individual snap arms of the rolling-element bearing cage. An assembling of the rolling-element bearing cage consists in attaching the cage ring 12 to the cage ring 22 by the snap connection. During the producing of this snap connection, the cage ring 12 is pressed against the cage ring 22 such that in comparison to an unassembled state in which the first cage ring is disposed spaced from the second cage ring, all snap arms of the first cage ring and all snap arms of the second cage ring 22 are deflected radially inward, and, with a further pressing of the cage ring 12 against the cage ring 22, snap in.

During the assembling of the rolling-element bearing cage 10, partial regions of the lateral ring 40, which is part of the first cage ring 12 and in an assembled state of the rolling-element bearing cage is disposed on an axial end 41 of the rolling-element bearing cage, are deflected during a producing of the snap connection relative to other partial regions 42 of the lateral ring 40 at least in an axial direction of the first cage ring 12. A larger deflection of the snap arms radially inward is thereby made possible. A force that is required for the producing of the snap connection thus depends on a rigidity of the lateral ring 40. The deflecting of the partial regions 38 is effected by them each performing a rotational movement.

In an installed state, the rolling-element bearing cage is part of a ball bearing. The ball bearing is in turn part of a vehicle with electric propulsion and supports there a shaft of an electric motor, which is provided to provide at least a contribution to a propulsion of the vehicle. Alternatively, the ball bearing can also be part of a transmission of the vehicle, which transmits a propulsion from the electric motor to a differential of the vehicle.

The cage ring 12 and the cage ring 22 are each configured one-piece. Each of the two cage rings can be produced in a single injection molding process, which is cost-effective, or by 3D printing. In the injection molding processes, molds without movable parts can be used, whereby a particularly cost-effective production is possible. Furthermore, after the injection molding processes, rods can be introduced into the injection molds, whereby a simple demolding is possible.

The rolling-element bearing cage can in particular be formed from polyamide 66 or polyetheretherketone. Here a reinforcing by fibers can be present, and specifically in particular a reinforcing by glass fibers and/or carbon fibers. Furthermore, the rolling-element bearing cage can also be comprised of a metallic material, such as in particular brass or aluminum. The rolling-element bearing cage can be homogeneously constructed from a single material.

Due to the fact that the two cage rings are attached to each other by snapping, a simple, fast, and cost-effective assembling of the rolling-element bearing cage is possible.

The rolling-element bearing cage is in particular robust in comparison to a one-part cage because a suitability for high rotational speeds is present. Further, when the cage is rotated, the snap arms 20,34 are forced radially outward, increasing a circumferential attachment of the snap arms and thus the cage ring 12 to the cage ring 22 by improving a frictional connection between the snap arms and the cage ring 22 through an increased force. Furthermore, during the rotation the snap connection becomes tighter.

The snap arm 20 tapers with increasing distance from the extension 14 in an alternative embodiment according to FIG. 5 (in this case, FIG. 5 is not merely schematic). This allows for easy demolding when manufactured by injection molding. During the demolding, the snap arm 20, when it is demolded curved as depicted in FIG. 5, is bent nearly straight. This is possible due to the elasticity of the rolling-element bearing material and a high casting temperature during an injection molding of the cage, but means that the degree of curvature of the snap arms is limited. The possible degree of curvature also depends on the thickness of the snap arms. The thicker the arms, the stronger they are, but the thickness limits the curvature. In the alternative embodiment according to FIG. 5, the snap arm 20 and the attachment region 24 then also configured according to an alternative embodiment have a round contact surface.

In the rolling-element bearing cage 10 there is no umbrella effect. Furthermore, the design of the rolling-element bearing cage 10 is suitable when the rolling-element bearing cage must be small, because there is no snap arm arranged on a radially outer side of the mounting portion 24, which is attached to the extension 14. Installation space is thereby saved in the radial direction.

The rolling-element bearing cage 10 is comprised of the cage rings 12, 22.

After a final assembly, the rolling-element bearing cage 10 can be part of any device in which it enables rotation at high speed. Here the rolling-element bearing cage can have comparatively small dimensions. For example, the rolling-element bearing cage can be used in a supporting of a shaft of a motor, or in special vacuum pumps.

Alternative exemplary embodiments are depicted in FIGS. 8 to 17. Essentially identical components, features, and functions are generally numbered with the same reference numbers. However, to distinguish the exemplary embodiments, the letter "a" or the letter "b" or the letter "c" are added to the reference numbers of the exemplary embodiments of FIGS. 8 to 17. The following description is essentially limited to the differences to the exemplary embodiment in FIG. 1 to FIG. 7, whereby reference can be made to the description of the embodiment example in FIGS. 1 to 7 with regard to components, features and functions which remain the same.

Figure 8:
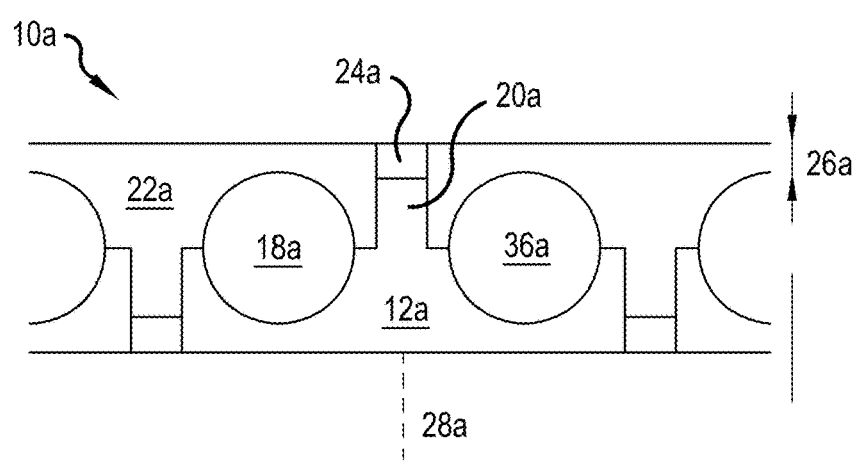
FIG. 8 is a schematic view of a part of a second exemplary embodiment of a rolling-element bearing cage according to the present disclosure.
Figure 9:
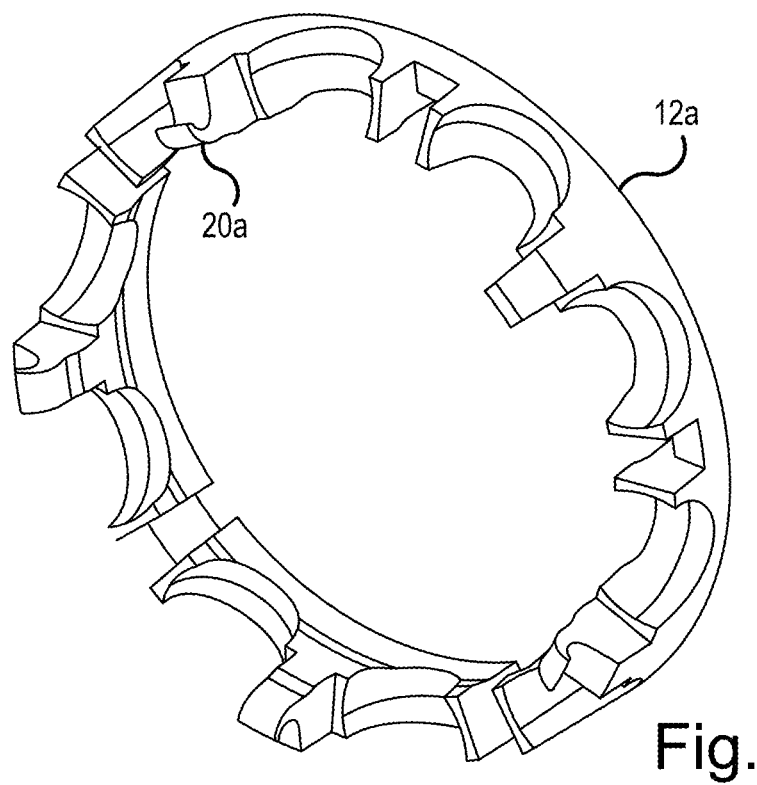
FIG. 9 is a perspective view of a cage ring of the rolling-element bearing cage of FIG. 8.
Figure 10:
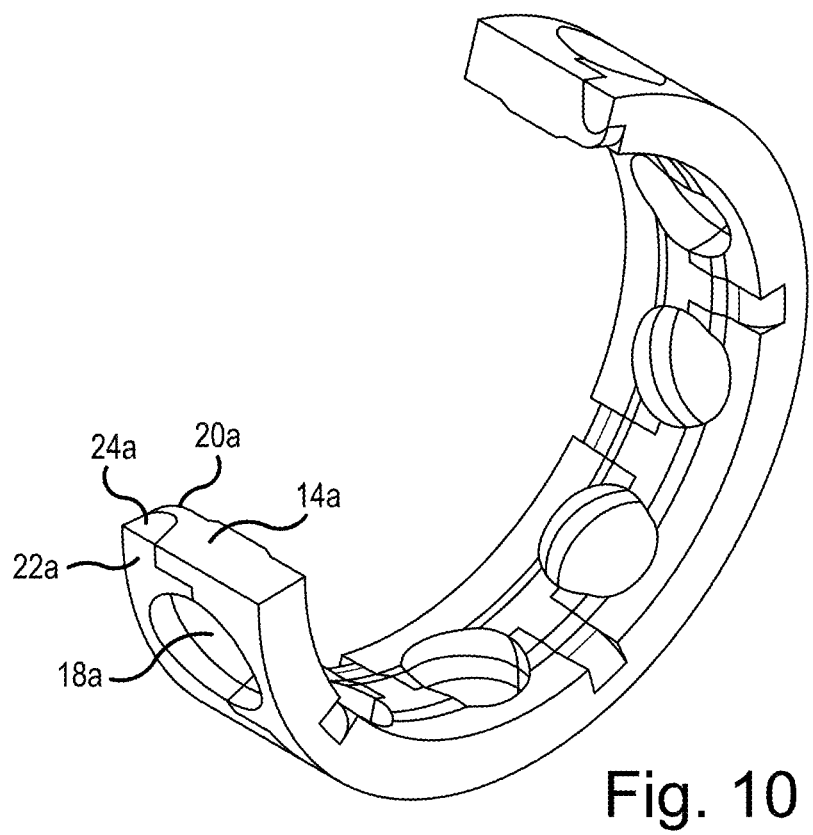
FIG. 10 is a perspective view of an axial section of rolling-element bearing cage of FIG. 8.
Figure 11:
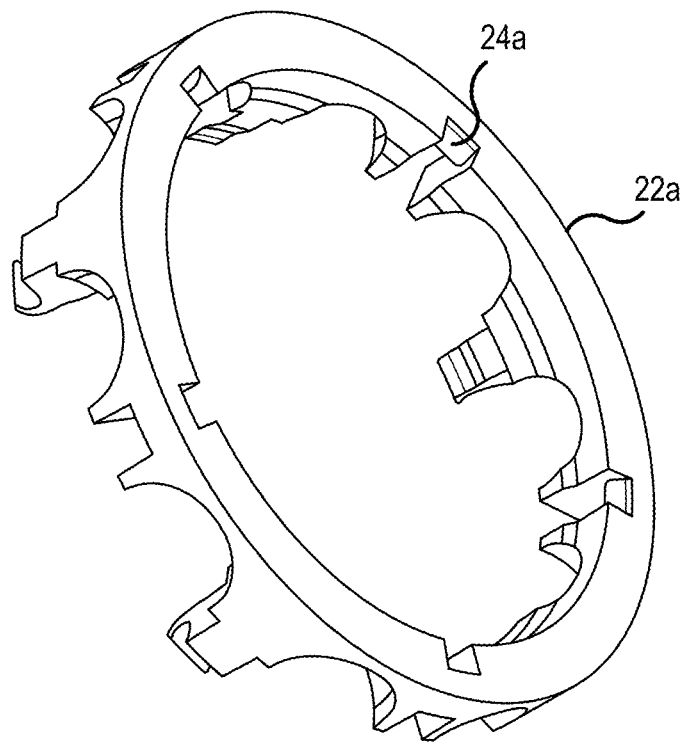
FIG. 11 is a perspective view of a second cage ring of the rolling-element bearing cage of FIG. 8.

FIGS. 8 to 11 represent a second exemplary embodiment. FIG. 8 shows a view from radially outside onto the first alternative exemplary embodiment of a rolling-element bearing cage 10a. Between two circumferentially adjacent pockets 18a, 36a, only one snap arm 20a of the rolling bearing cage is arranged in each case. The snap arm 20a is part of a cage ring 12a, and is snapped in an attachment region 24a of a second cage ring 22a (FIGS. 8 and 10). The rolling-element bearing cage includes an even number of pockets. Therefore, the cage rings are identical. However, in an alternative embodiment, the rolling-element bearing cage can also include an odd number of pockets. The two exemplary embodiments are particularly advantageous for situations in which the rolling-element bearing cage is to be small, or only little space is present between two adjacent pockets 18a, 36a.

Figure 12:
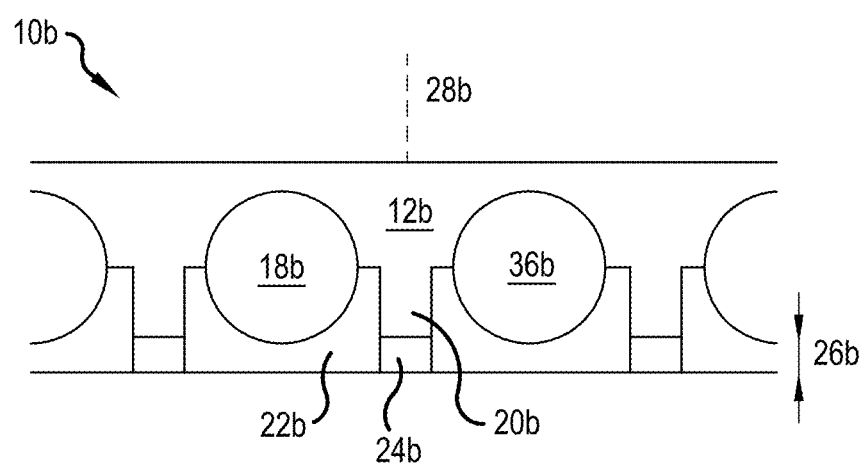
FIG. 12 is a schematic view of a part of a third exemplary embodiment of a rolling-element bearing cage according to the present disclosure.
Figure 13:
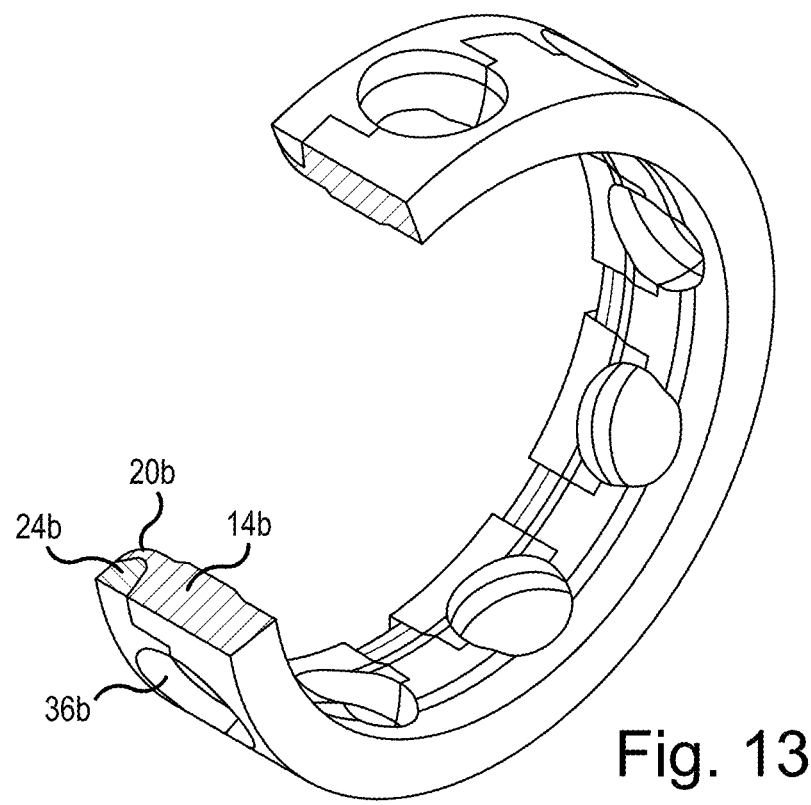
FIG. 13 is a perspective view of an axial section of the rolling-element bearing cage of FIG. 12.
Figure 14:
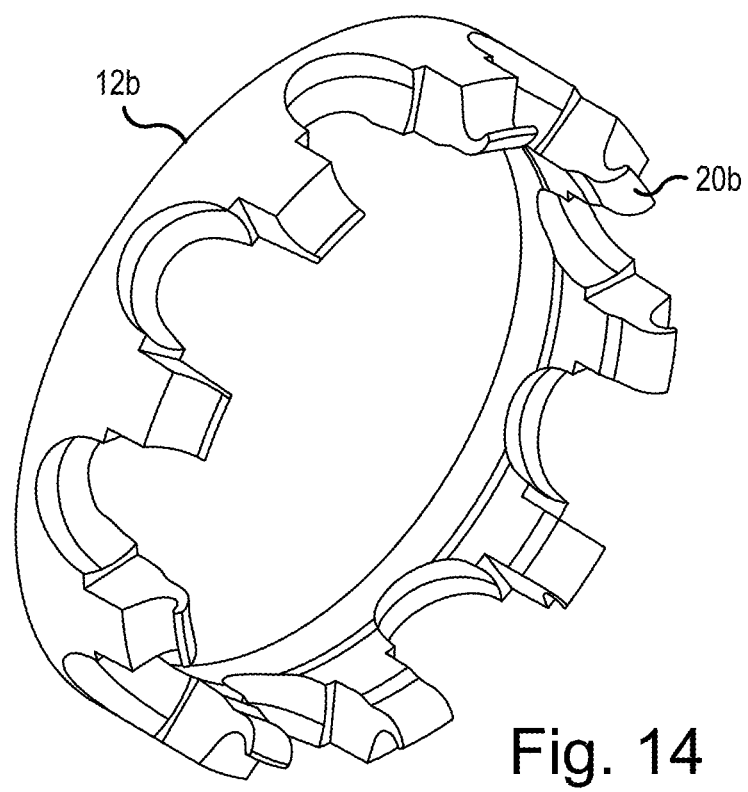
FIG. 14 is a perspective view of a first cage ring of the rolling-element bearing cage of FIG. 12.
Figure 15:
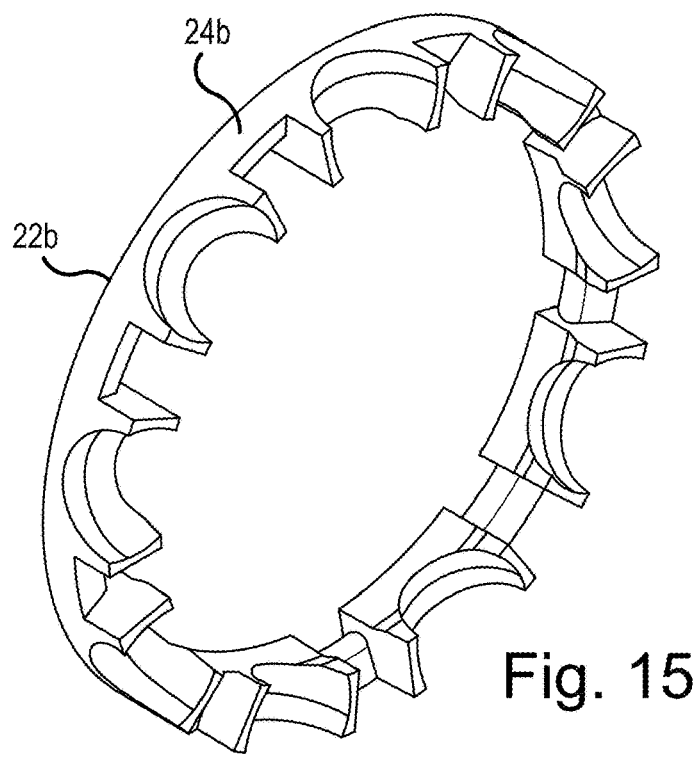
FIG. 15 is a perspective view of a second cage ring of the rolling-element bearing cage of FIG. 12.
Figure 16:
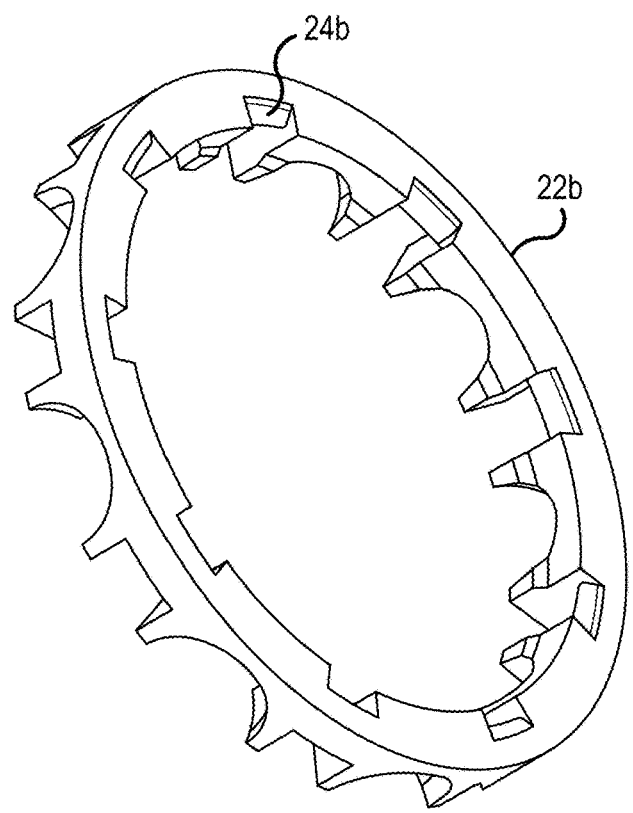
FIG. 16 is a further perspective view of the second cage ring of the rolling-element bearing cage of FIG. 12.

FIGS. 12 to 16 represent a third exemplary embodiment. FIG. 12 shows a radially outer view of the second alternative exemplary embodiment of a rolling-element bearing cage 10b. In each case only a single snap arm 20b of the rolling-element bearing cage is disposed between two pockets 18b, 36b adjacent in the circumferential direction (FIGS. 12 and 14). All snap arms of the rolling-element bearing cage are part of a cage ring 12b. A second cage ring 22b is free of snap arms (FIGS. 15 and 16). The present exemplary embodiment is suitable for an even number of pockets. In particular, the exemplary embodiment is particularly suitable for an odd number of pockets because in this case it is not possible to have two identical cage rings 12, 22.

Figure 17:
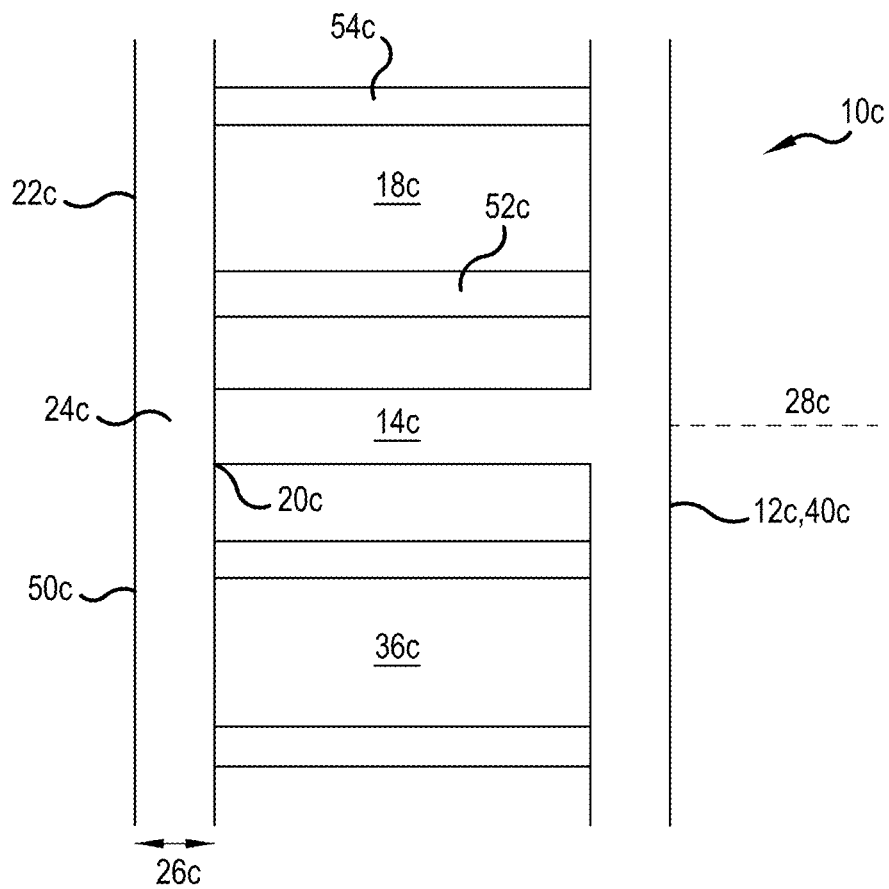
FIG. 17 is a schematic view from radially outside onto a fourth embodiment of a rolling-element bearing cage according to the present disclosure.

FIG. 17 shows a radially outer view of a fourth embodiment of a rolling-element bearing cage 10c. A snap arm 20c is arranged with respect to a circumferential direction of the rolling bearing cage between two pockets 18c, 36c of the rolling bearing cage arranged adjacent to each other in the circumferential direction. A first of the pockets 18c is delimited by a lateral ring 40c of the first cage ring 12c and a lateral ring 50c of the second cage ring 22c and a first crosspiece 52c of the rolling-element bearing cage and a second crosspiece 54c of the rolling-element bearing cage, wherein the second crosspiece has a greater distance from the snap arm 20c than the first crosspiece. The snap arm and an extension 14c are disposed spaced from the first crosspiece. The snap arm is also spaced from those crosspieces that delimit the pocket 36c. In the present exemplary embodiment, the rolling-element bearing cage is a cage of a cylindrical roller bearing. In alternative embodiments the crosspieces can also be shaped such that they are adapted to rolling-elements of a different geometry, such as, in particular, balls.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling element bearing cages and assemblies including such cages.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Rolling-element bearing cage
12 Cage ring
14 Extension
16 Boundary
18 Pocket
20 Snap arm
22 Cage ring
24 Attachment region
26 Section
28 Central axis
30 Radial direction
32 Surface region
34 Snap arm
36 Pocket
38 Partial region
40 Lateral ring
41 End
42 Partial region
44 Plane
46 Plane
48 Recess
50 Lateral ring
52 Crosspiece
54 Crosspiece

What is claimed is:

1. A rolling-element bearing cage with a first cage ring which includes an axial extension and at least one snap arm disposed directly on the extension and at least one second cage ring which includes at least one attachment region at which the at least one snap arm for forming a snap connection is snapped,
   wherein a distance from at least a portion of each snap arm to a central axis of the rolling bearing cage is less than a distance from each respective attachment region to the central axis of the rolling bearing cage, and
   wherein with respect to a circumferential direction of the rolling-element bearing cage, the snap arm is disposed between two pockets disposed adjacent in the circumferential direction of the rolling-element bearing cage, and a first of the pockets is delimited by a lateral ring of the first cage ring and a lateral ring of the second cage ring and a first crosspiece of the rolling-element bearing cage and a second crosspiece of the rolling-bearing cage, wherein the second crosspiece has a greater distance from the snap arm than the first crosspiece, wherein the snap arm and/or the extension are disposed spaced from the first crosspiece.

2. The rolling-element bearing cage according to claim 1, wherein the attachment region includes a radially outwardly facing surface.

3. The rolling-element bearing cage according to claim 1,
wherein the distance from at least the portion of each snap arm to the central axis of the rolling bearing cage is a first distance, and
wherein the entire attachment region is located more than the first distance from the central axis of rotation.

4. The rolling-element bearing cage according to claim 1,
wherein the first cage ring and the second cage ring are identical.

5. The rolling-element bearing according to claim 1,
wherein the portion of the at least one snap arm includes a radially outwardly facing concave surface, and
wherein the attachment region includes a radially inwardly facing convex surface.

6. A rolling-element bearing with a rolling-element bearing cage according to claim 1.

* * * * *